United States Patent
Beazley

(10) Patent No.: US 7,706,624 B2
(45) Date of Patent: Apr. 27, 2010

(54) APPARATUS AND METHOD FOR REDUCING NOISE IN AN IMAGE

(75) Inventor: Todd Martin Beazley, Portland, OR (US)

(73) Assignee: Thomson Licensing, Boulogne Billancourt (FR)

( * ) Notice: Subject to any disclaimer, the term of this patent is extended or adjusted under 35 U.S.C. 154(b) by 643 days.

(21) Appl. No.: 10/567,050

(22) PCT Filed: Aug. 4, 2003

(86) PCT No.: PCT/US03/24525

§ 371 (c)(1),
(2), (4) Date: Feb. 2, 2006

(87) PCT Pub. No.: WO2005/017817

PCT Pub. Date: Feb. 24, 2005

(65) Prior Publication Data

US 2006/0245661 A1    Nov. 2, 2006

(51) Int. Cl.
*G06K 9/40* (2006.01)

(52) U.S. Cl. .................. 382/260; 382/266; 382/274; 348/607; 358/463; 358/471

(58) Field of Classification Search .......... 382/260, 382/261, 263, 266, 274, 195, 312, 205, 265, 382/168, 173; 348/412, 415, 607, 610; 358/463, 358/471; 386/109, 112
See application file for complete search history.

(56) References Cited

U.S. PATENT DOCUMENTS

| | | | | |
|---|---|---|---|---|
| 4,238,772 A | * | 12/1980 | von Gierke et al. ......... | 348/629 |
| 4,908,872 A | * | 3/1990 | Toriu et al. .................. | 382/197 |
| 5,352,878 A | * | 10/1994 | Smith et al. ............ | 235/462.16 |
| 5,519,452 A | * | 5/1996 | Parulski ...................... | 348/620 |
| 5,682,326 A | | 10/1997 | Klingler et al. | |
| 5,787,204 A | | 7/1998 | Fukuda | |
| 5,798,948 A | * | 8/1998 | Rashkovskiy et al. ....... | 348/620 |
| 5,949,916 A | * | 9/1999 | Chun ......................... | 382/261 |
| 6,340,994 B1 | | 1/2002 | Margulis et al. | |
| 6,389,176 B1 | | 5/2002 | Hsu et al. | |
| 6,421,384 B1 | * | 7/2002 | Chung et al. ........... | 375/240.09 |

(Continued)

FOREIGN PATENT DOCUMENTS

CN    1114813 A    1/1996

OTHER PUBLICATIONS

Search Report Apr. 27, 2004.

*Primary Examiner*—Sheela C Chawan
(74) *Attorney, Agent, or Firm*—Robert D. Shedd; Joseph J. Opalach

(57) ABSTRACT

An image processor includes a Lee filter for processing image data to improve noise therefrom. The Lee filter includes a smoothing control signal. During filtering of the image data, the smoothing control signal is converted to a monochrome video signal that is provided to a display instead of, or in addition to, the filtered image data. The image projected by the display of the smoothing control signal highlights edge activity in the filtered image. This display of edge activity makes it easier to locate noisy areas in the image data and fine-tune the amount of filtering to further reduce noise present in the image data and yet leave the desired image details alone.

25 Claims, 9 Drawing Sheets

U.S. PATENT DOCUMENTS

| | | | |
|---|---|---|---|
| 6,633,342 B2 * | 10/2003 | Kim | 348/606 |
| 6,678,009 B2 * | 1/2004 | Kahn | 348/569 |
| 6,697,497 B1 * | 2/2004 | Jensen et al. | 382/100 |
| 6,697,534 B1 * | 2/2004 | Tan et al. | 382/261 |
| 6,947,098 B2 * | 9/2005 | Hentschel et al. | 348/631 |
| 6,973,218 B2 * | 12/2005 | Alderson et al. | 382/260 |
| 7,027,659 B1 * | 4/2006 | Thomas | 382/254 |
| 7,046,307 B1 * | 5/2006 | Hui | 348/700 |
| 7,082,211 B2 * | 7/2006 | Simon et al. | 382/118 |

* cited by examiner

APPARATUS AND METHOD FOR REDUCING NOISE IN AN IMAGE

This application claims the benefit, under 35 U.S.C. § 365 of International Application PCT/US03/24525, filed Aug. 4, 2003, which was published in accordance with PCT Article 21(2) on Feb. 24, 2005 in English.

BACKGROUND OF THE INVENTION

The present invention generally relates to compression, and, more particularly, to preprocessing image data before compression to reduce the presence of noise in an image, whether a still image or a sequence of images such as in a video.

Image data is typically large in size. This is especially so if the image data represents video. As such, and as known in the art, it is preferable to compress the image data before transmission, or even storage, of the image data. In this regard, there are numerous techniques for compressing image data that to one degree or another provide some level of fidelity to the original image data.

However, when compressing image data, the image data may include noise that can adversely affect the compression efficiency since compression algorithms generally cannot distinguish noise from desired detail in the image. In other words, the size of the compressed image data may be larger than is necessary due to the presence of noise in the image data. For example, if an image is first recorded on a video cassette recorder (VCR), the recorded image data—upon playback—may now include noise. As a result, use of the VCR as a source of the image data for streaming across the Internet may, even with compression, require the use of more bandwidth than would be necessary if the noise were not present in the image data to begin with.

As such, if the image data includes noise it is known to filter the image data to first attempt to remove, or reduce, any noise before compression of the image data. Typically, one of a number of known filter techniques is applied to the image data and the filtered image data is previewed to examine the affect on the fidelity of the image. Filter settings are made by viewing the filtered image and adjusting the filter controls in an attempt to find a compromise between reduced noise and blurring of image details. Too much filtering may blur the image, too little filtering will not remove enough of the noise in the image data to improve the compression efficiency. Unfortunately, it is especially difficult to remove low-level noise that is difficult, or impossible, to see in the image but which still reduces compression efficiency. This difficulty is compounded with video, in which the image data is constantly changing.

SUMMARY OF THE INVENTION

As noted above, when filtering image data, it may be difficult to adjust the filtering to remove, e.g., low-level noise from the image data, by viewing the filtered image. However, and in accordance with the principles of the invention, I have realized that displaying where the filtering is being performed on the image data to remove noise instead of, or in addition to, displaying the filtered image data improves the ability to quickly set filter parameters to increase the removal of even low-level noise from the image data.

In an embodiment of the invention, an image processor includes Lee's local statistics filter (or Lee filter) for processing image data to remove noise therefrom. The Lee filter includes a smoothing control signal. During filtering of the image data, the smoothing control signal is converted to a monochrome video signal that is provided to a display instead of, or in addition to, the filtered image data. The displayed image representation of the smoothing control signal highlights edge activity in the filtered image. This display of edge activity makes it easier to locate noisy areas in the image data and fine-tune the amount of filtering to further reduce noise present in the image data and yet leave the desired image details alone. In particular, the display of the smoothing control signal of the Lee filter indicates light and dark areas. The dark areas indicate where the Lee filter is performing larger amounts of filtering on the image data while the brighter areas indicate where the Lee filter is performing smaller amounts of filtering on the image data.

In another embodiment of the invention, a server includes a Lee filter and a compressor for providing streaming content, e.g., video, over the Internet. The server visually displays a representation of a smoothing control signal of the Lee filter when filtering image data representing a video. The resulting displayed edge activity of the filtered image data is used to set parameters for the Lee filter, i.e., create an associated filter template for the video. The filter template is subsequently recalled for filtering the video in real-time for providing streaming video over the Internet.

In another embodiment of the invention, a server includes a Lee filter and a compressor for providing streaming content, e.g., video, over the Internet. A smoothing control signal of the Lee filter is converted to a monochrome video signal. An average brightness level for the monochrome video signal version of the smoothing control signal is set for an image or video. This set average brightness level is used to represent a desired level of filtering of the image or video. When filtering the image or video, parameters of the Lee filter are adjusted in until the average brightness level of the monochrome video signal version of the smoothing control signal substantially matches the set average brightness level.

In another embodiment of the invention, a server includes a processor, display and a memory for storing a computer program therein. The processor executes the computer program stored in the memory for filtering image data, wherein the computer program, when executed by the processor, provides a preview mode for rendering on the display where filtering is being performed on the image data.

DETAILED DESCRIPTION

Other than the inventive concept, the elements shown in the figures are well known and will not be described in detail. Also, familiarity with image processing and content delivery is assumed and is not described in detail herein. For example, other than the inventive concept, microprocessors, memory, analog and digital image formats, content streaming, media players, compression, etc., are well known and not described in detail herein. In addition, the inventive concept may be implemented using conventional programming techniques, which, as such, will not be described herein. Finally, like-numbers on the figures represent similar elements. It should also be noted that the term "signal" includes both hardware forms (e.g., electrical) and software forms (e.g., a variable). In addition, it should be noted that the use of the term "memory" below encompasses machine readable storage mediums such as, but not limited to, hard disk drives, floppy diskettes, CD-ROMS (including writable CD-ROMS), DVDs, etc.

Figure 1:
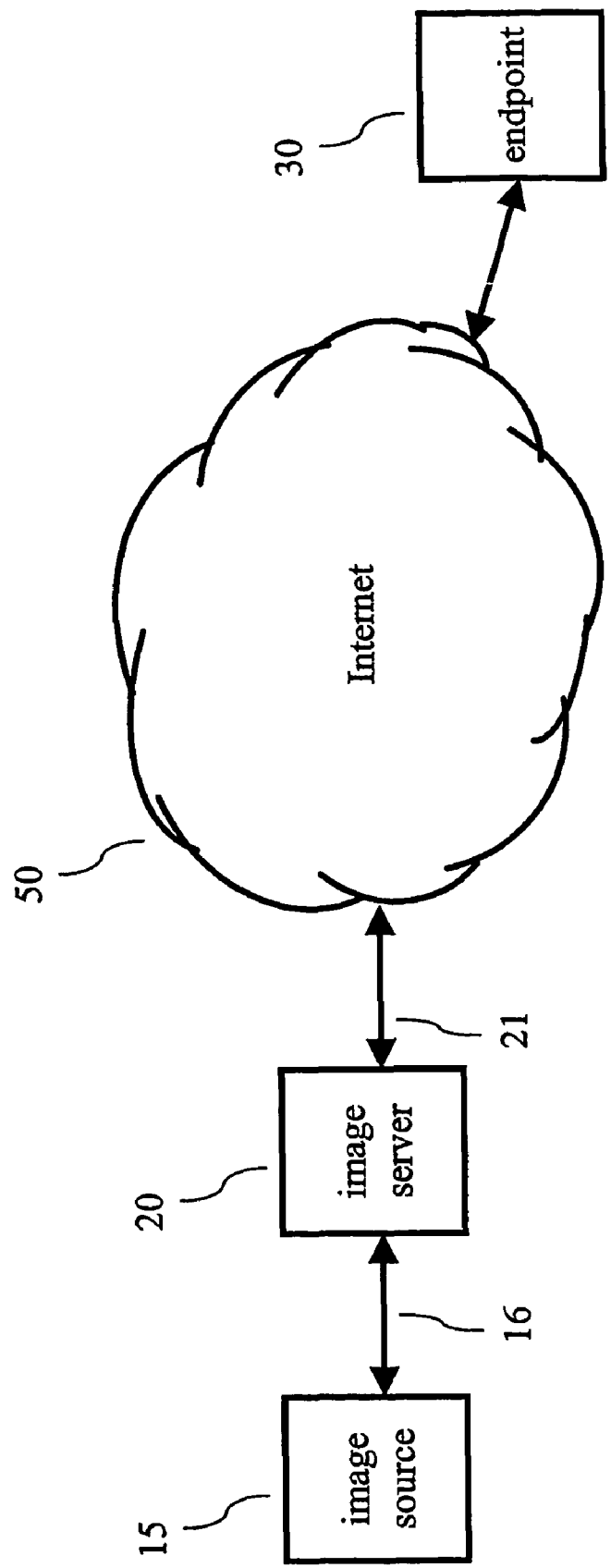
FIG. 1 shows an illustrative content delivery system embodying the principles of the invention.

An illustrative embodiment of a content delivery system in accordance with the principles of the invention is shown in FIG. 1. Image source 15 provides image data via signaling path 16 to image server 20 (described below), which processes the received image data to provide compressed image data via signaling path 21 for distribution to endpoints, as represented by endpoint 30, via Internet 50. The later is representative of any network capable of transmitting packets and includes switched and non-switched facilities whether wired or wireless and, as such, includes other components (not shown) such as routers and/or switches for communicating packets between an originating point and an endpoint. Image source 15 illustratively represents any source capable of providing image data, whether representing a still picture or video. For example, image source 15 may be a file source such as a hard disk drive coupled to image server 20 such that the image data represents an image, or images, in a digital format; or image source 15 may be a VCR that provides image data representing video in an analog format, etc. Likewise, although shown as a separate component not connected to Internet 50, image source 15 may also provide image data to image server 20 via Internet 50. Endpoint 30 is representative of any destination point, e.g., a consumer's video equipment, whether a computer running Windows® Media Player, or a set-top box coupled to a display; or even a server of a content provider, such as a cable company, which repackages received compressed image data as content for further distribution, e.g., to a subscriber. Likewise, image server 20 may also be a server of a content provider.

As noted earlier, when filtering image data it may be difficult to adjust parameters of the filtering operation to remove noise from the image data by just previewing the filtered image data. This is especially true in the case where low-level noise is present in the image data. As such, any noise remaining in the image data before compression may result in compressed image data that is larger in size—and that requires even more bandwidth for transmission or space for storage—than would result if the noise could be even further reduced or eliminated from the image data. Therefore, and in accordance with the principles of the invention, image server 20 displays where the filtering is performed on the image data instead of, or in addition to, displaying the filtered image data. This improves the ability to quickly set filter parameters to increase the removal of even low-level noise from the image data, thus further reducing the size of the compressed data and, concomitantly, reducing the required bandwidth for transmission or space for storage.

Figure 2:
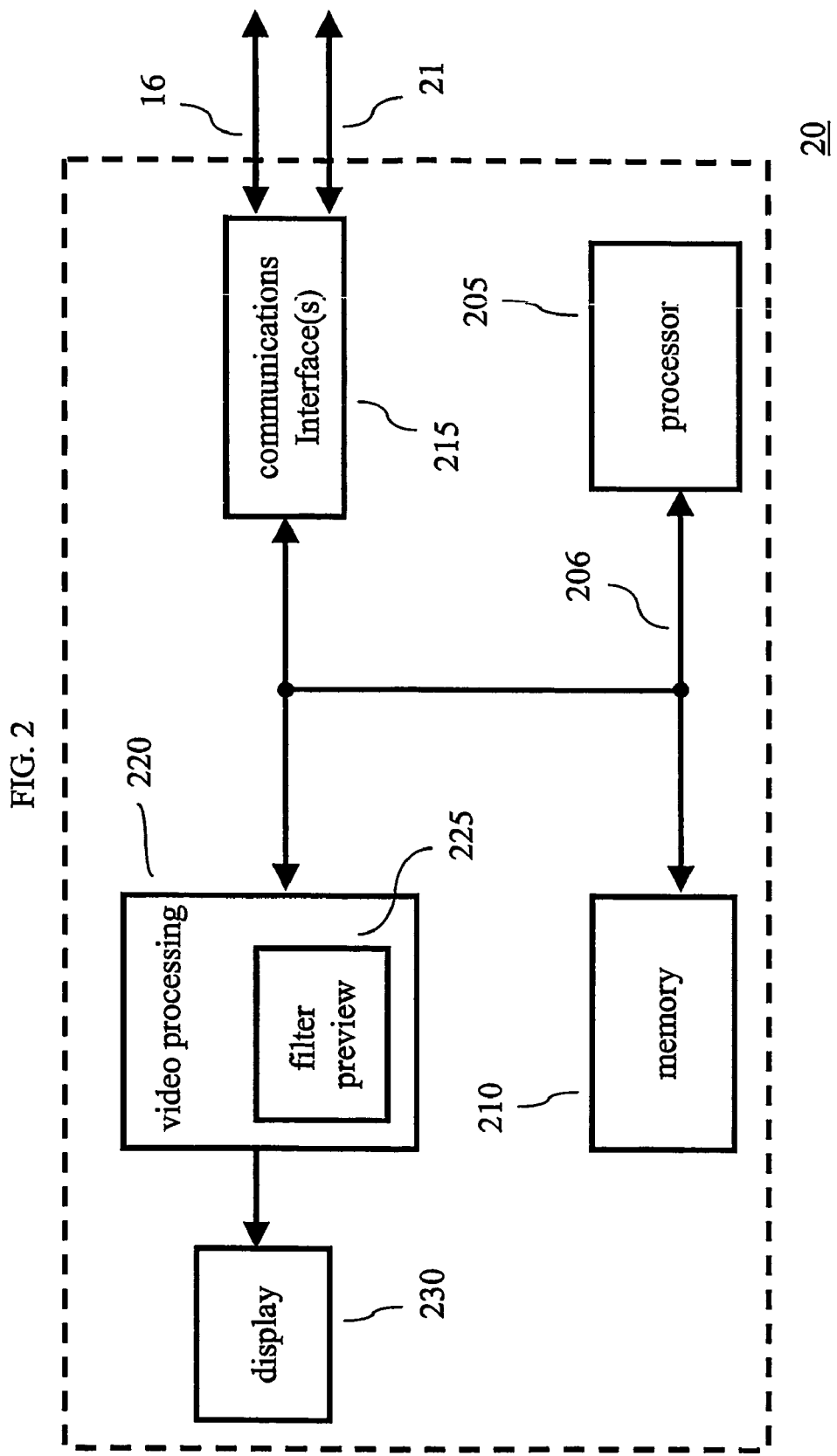
FIG. 2 shows in illustrative image server in accordance with the principles of the invention.

Turning now to FIG. 2, an illustrative high-level block diagram of an image server 20 in accordance with the principles of the invention is shown. Image server 20 is a stored-program-control based processor architecture and includes one or more processors as represented by processor 205; bus 206, which represents one or more communication paths for coupling the elements of image server 20 together; memory 210 (volatile and/or non-volatile, hard disk, CD-ROM, DVD, random access memory (RAM), etc.) for storing program instructions and data, e.g., for performing the illustrative methods described below; video processing element 220 for processing image data, which includes, in accordance with an aspect of the invention, filter preview element 225 (described below); display 230 for viewing filtered image data and, in accordance with an aspect of the invention, for viewing where the filtering is performed on the image data; and at least one receiver such as represented by communications interface(s) 215 for coupling to, e.g., video source 15, via signaling path 16 for receiving image data, and Internet 50 for transmitting compressed image data via signaling path 21. Again, it should be noted that in other embodiments of the invention image data may be provided, or sourced, in other ways, e.g., from memory 210, i.e., memory 210 becomes video source 15 in accordance with the principles of the invention. Similarly, signal path 16 may also provide a communication link to Internet 50. In addition, the image data may also be initially compressed, requiring decompression before application to filter preview element 225.

Figure 3:
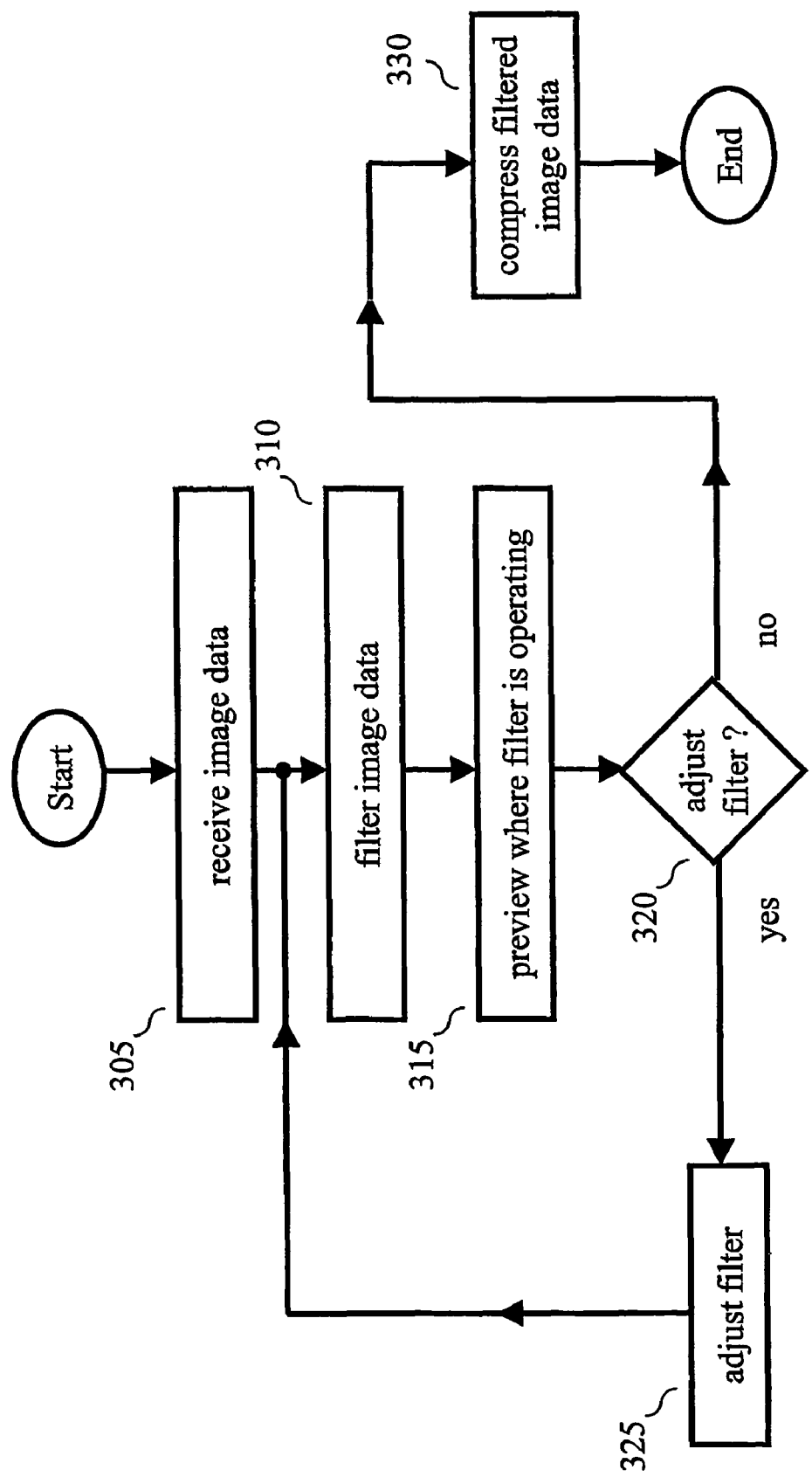
FIG. 3 show an illustrative flow chart in accordance with the principles of the invention.

An illustrative flow chart in accordance with the principles of the invention for use in image server 20 is shown in FIG. 3. In step 305, image server 20 receives image data. The later can be either a single picture, multiple pictures, or video. In step 310, image server 20 filters the received image data to further remove noise before compression. As described further below, image server 20 illustratively uses a Lee filter as known in the art to filter the received image data. In step 315, and in accordance with the principles of the invention, image server 20 provides a preview image on display 230 (described below). This preview image visually shows where the Lee filter is operating on the received image data. In step 320, a decision is made if filter parameters of the Lee filter should be further adjusted, e.g., to remove additional noise. In this example, an operator viewing the preview image on display 230 makes the decision to adjust the filtering parameters to achieve a "perceived" level of brightness (described below) by looking at the light/dark areas of the preview image. However, as described further below, image server 20 may be programmed to automatically adjust the filter parameters in accordance with an aspect of the invention. If the filter parameters are to be adjusted, they are adjusted in step 325 and the received image data is filtered again in step 310 with the new filter parameters, etc. On the other hand, if there is to be no further adjustment to the filter parameters, then the filtered image is compressed in step 330, using any suitable compression technique as known in the art. At this point, the compressed image may be transmitted, e.g., via Internet 50, or stored for later recall.

Figure 4:
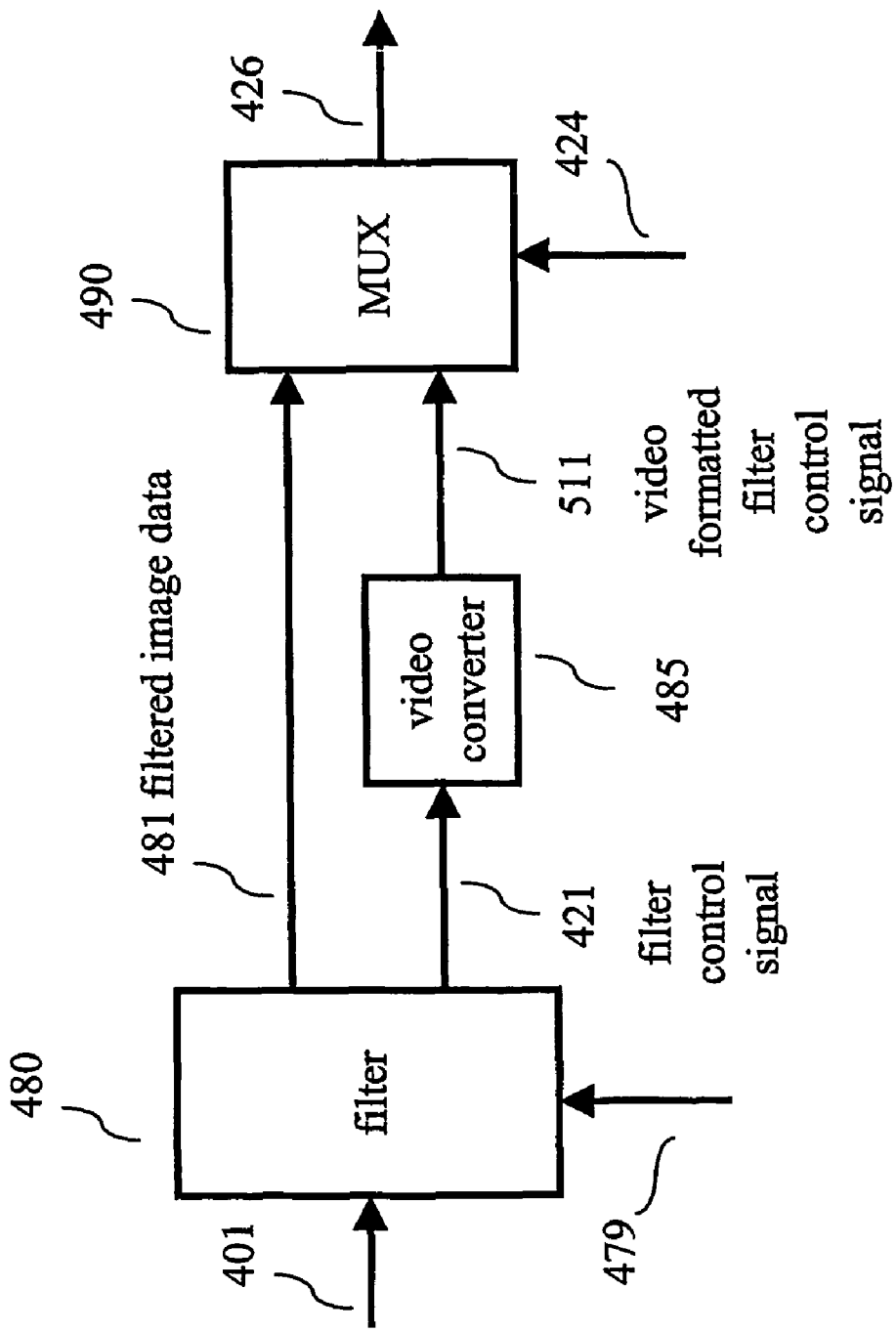
FIG. 4 shows an illustrative filter preview element in accordance with the principles of the invention.

As noted above with respect to step 315 of FIG. 3, and in accordance with the principles of the invention, a preview display capability is added to a noise reduction filter. Turning now to FIG. 4, an illustrative embodiment of a noise reduction filter having a preview display capability is shown. Filter preview element 225 includes filter 480, video converter 485 and multiplexer (mux) 490. Filter 480 illustratively implements a Lee filter as the noise reduction filter to further remove noise from image data 401 (described further below). As such, filter 480 operates on the applied image data 401 to provided filtered image data 481 to mux 490. In addition, and in accordance with an aspect of the invention, filter 480 also provides at least one filter control signal 421. The latter is converted to a video signal by video converter 485 for application to mux 490. A preview mode signal 424 further controls the operation of mux 490 to select between at least two modes of operation. In this example, it is assumed that preview mode signal 424 represents a binary form of signal where, e.g., an associated logical level of "one" corresponds to a "preview filter operation mode," while an associated logical level of zero corresponds to a "preview filtered image mode." It should be noted that this separation of the signals for display and the number of modes are not required for the inventive concept. For example, both the filtered image data and a filter control signal may be viewed simultaneously, e.g., within two separate windows of display 230. Further, there may be more than one display mode. However, in this example, if preview mode signal 424 represents the preview filtered image mode, then mux 490 provides filtered image data 481 as signal 426 to display 230. On the other hand, if preview mode signal 424 represents the preview filter operation mode, then mux 490 provides the video form of filter control signal 421, i.e., signal 511, as signal 426 to display 230.

Figure 5:
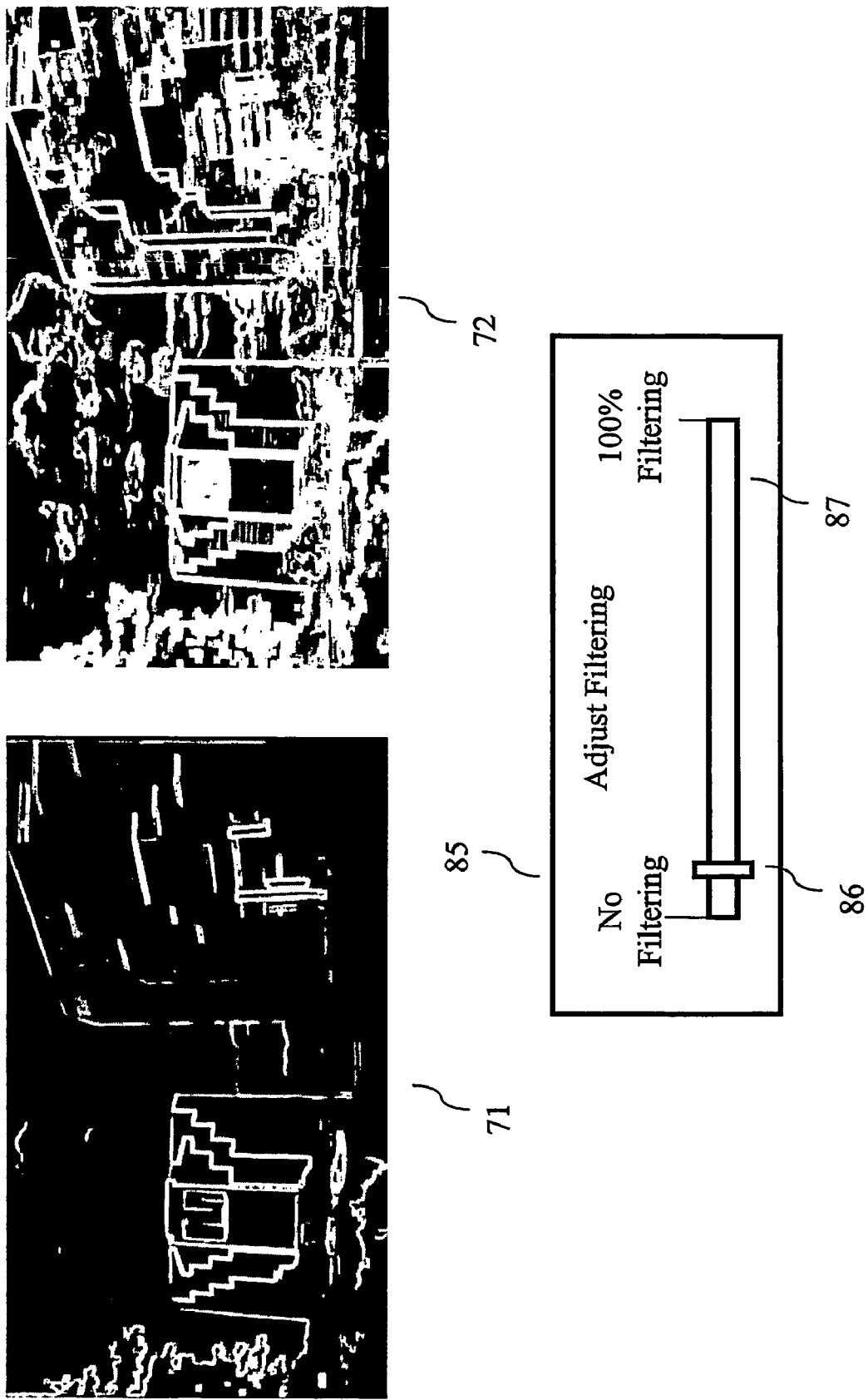
FIG. 5 shows an illustration of two preview filter operation images in accordance with the principles of the invention along with an illustrative user interface.

A Lee filter dynamically changes the filtering process on, in effect, a pixel-by-pixel basis by measuring the amount of activity, or edge activity in small areas of the image data 401. In other words, the Lee filter examines the amount of signal activity (edge detail) in small rectangular portions (pixel windows) of an image and applies a smoothing algorithm to the center pixel of each window. The smoothing algorithm changes the amount of filtering of the center pixel as a function of edge activity within the window. Illustratively, the filter control signal 421 represents the amount of edge activity at a point in time for a particular pixel group. As such, the image developed from the filter control signal 421 pictorially shows edge activity, i.e., where filter 480 is performing noise filtering on the image data 401. Consequently, by viewing the image representative of the filter control signal 421, it is easier to both locate noisy areas in the image and fine-tune the amount of filtering to reduce the noise and leave desired image details alone. An illustration of an edge activity display is shown in FIG. 5. Both images 71 and 72 are monochrome (e.g., back and white) images of a filter control signal in accordance with the principles of the invention operating on the same image data 401. Images 71 and 72 show grayscale representations of the filter control signal 421 in which darker areas indicate where larger amounts of filtering are being performed by filter 480, while brighter areas indicate where smaller amounts of filtering are being performed by filter 480. In one illustration of the inventive concept, during the preview filter operation mode, a user observes the image of the filter control signal on display 230 and, in response thereto, adjusts a filter control signal 479 of FIG. 4 to vary the amount of filtering performed by filter 480 until a desired average brightness level is achieved on the image of the filter control signal by viewing the image of the edge activity (light areas in the images 71 and 72). In this context, image 71 has fewer light areas—hence less edge activity. Consequently, filter 480 provides a filtered image (not shown) that is not as sharp as compared to the filtered image (not shown) associated with image 72, which has more light areas, i.e., more edge activity. A user can adjust the amount of filtering by implementing a user interface, e.g., a text box, etc. An illustrative user interface for controlling the amount of filtering is shown in FIG. 5 as a slider window 85. Movement of the slider 86 from one end of the slider control 87 to the other end proportionally changes filter control signal 479 to vary the amount of filtering as, e.g., represented by images 71 and 72 of FIG. 5.

Figure 6:
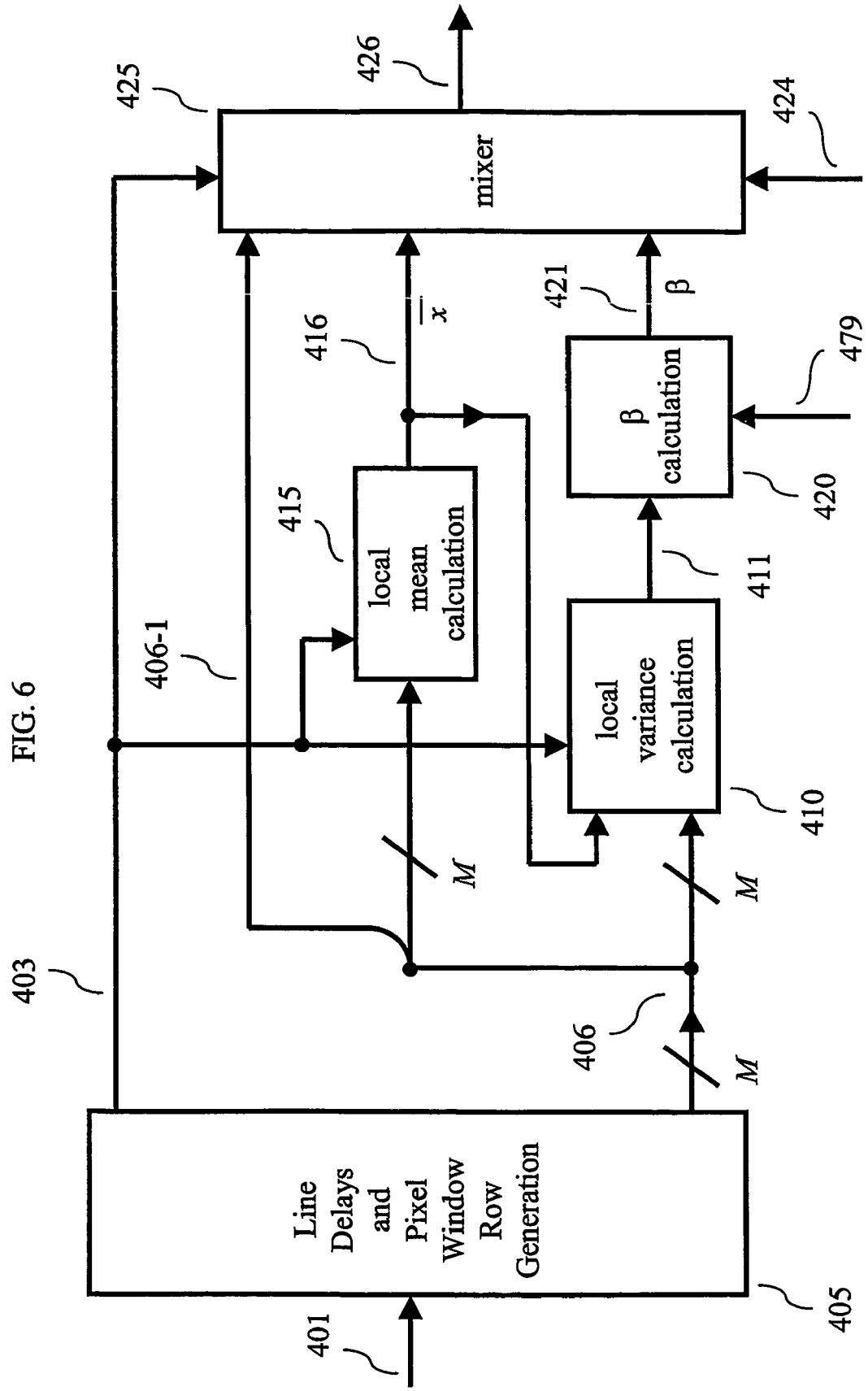
FIGS. 6, 7, 8 and 9 show illustrative filter preview elements, a brightness level and a user interface in accordance with the principles of the invention.
Figure 7:
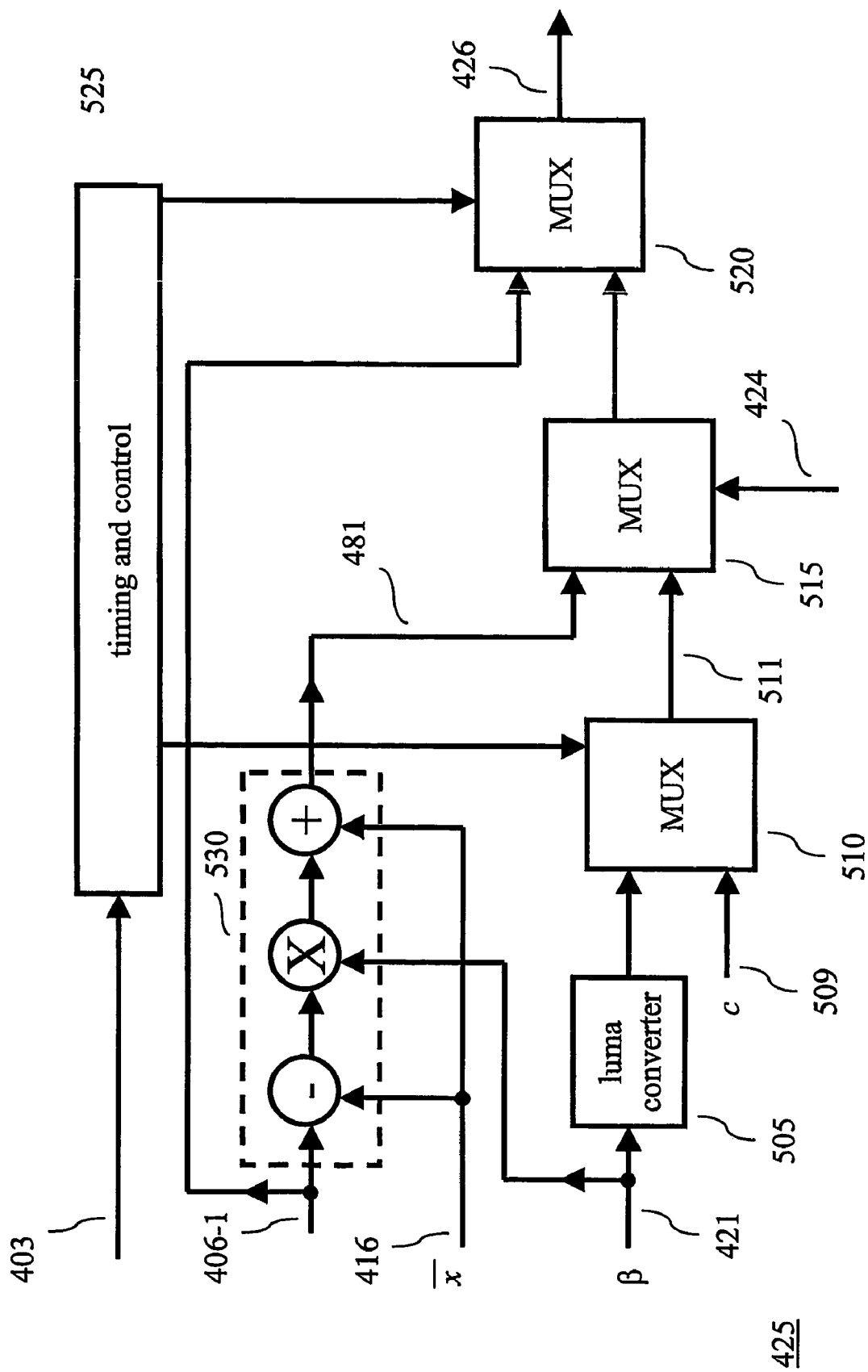

Turning now to FIGS. 6 and 7, another illustrative embodiment of filter preview element 225 is shown. Image data 401 is illustratively a multiplexed stream of luma (Y) and chroma (Cr, Cb) components of video, which are processed by filter preview element 225. As known in the art, Y represents the brightness or luminance, while Cr and Cb represent the color information (e.g., Cr corresponds to the red minus luminance signal while Cb corresponds to the blue minus luminance signal). However, in the discussion that follows, the term "pixel" is used for simplicity to describe the processing notwithstanding that the filter actually processes the Y, Cr, and Cb components separately.

Filter preview element 225 includes element 405, element 410, element 415, element 420 and mixer 425. Generally speaking, a Lee filter operates on M×L groups of pixels. For the purposes of this description, it is assumed that M=L=7. As such, each pixel group has seven rows of pixels, each row including seven pixels. Element 405 includes six line delay memories (or buffers) (not shown) such that element 405 sequentially provides rows of pixels for a particular pixel group as represented by signal 406. Element 405 also generates raster timing signal 403 as known in the art. Illustratively, row 3 of each pixel group includes the center pixel. This center pixel is also shown in FIG. 6 as signal 406-1.

In accordance with an aspect of the invention, the Lee filter is used to adaptively filter image data (whether a still picture or video). As implemented herein, the Lee filter adapts to the image data and will back off when reaching a sharp edge, i.e., an area of the image with more edge detail. The Lee filtering operates by first calculating, in element 415, the local mean of each pixel group, or window, in accordance with the following equation:

$$\text{local\_mean}(\bar{x}) = \frac{1}{N}\sum_{i=1}^{N} x_i, \tag{1}$$

where N is the number of pixels in the filter window, and $x_i$ represents each of the pixels in the pixel group, or window. For this implementation, N=49, i.e., there are forty-nine pixels in each pixel group. Element 415 provides signal 416, which represents the local mean for a pixel group. The local mean signal 416 is applied to mixer 425 and element 410.

After the local mean of a particular pixel group is determined, element 410 calculates the variance on the same 49 pixel group in accordance with the following equation:

$$\text{local\_variance}(\sigma_x^2) = \frac{1}{N-1}\sum_{i=1}^{N}(x_i - \bar{x})^2. \tag{2}$$

Element 410 provides signal 411, which represents the local variance for a particular pixel group to element 420. The latter determines a blend factor, $\beta$, (or smoothing control signal) in accordance with the following equation:

$$\beta = \max\left(\frac{\sigma_x^2 - \sigma_n^2}{\sigma_x^2}, 0\right), \tag{3}$$

where $\sigma_n^2$ is a noise variance estimate and is a user-adjustable parameter to control the degree of filtering (e.g., the above-described signal 479 of FIG. 4). Element 420 provides signal 421, which is representative of the determined blend factor, $\beta$, to mixer 425. The latter determines the amount of filtering performed by the Lee filter in the preview filtered image mode in accordance with the following equation:

$$\text{mixer\_output} = \beta x_c + (1-\beta)\bar{x}, \quad (4a)$$

where $x_c$ is the center pixel of the particular pixel group. Equation (4a) can be rewritten as:

$$\text{mixer\_output} = \beta(x_c - \bar{x}) + \bar{x}. \quad (4b)$$

In particular, when β has a value of zero (i.e., when the local variance is less than or equal to the estimate), mixer 425 provides maximum filtering of image data 401 (100% of the local mean is provided by mixer 425 as the filter output signal). Conversely, as the value of β increases towards one (i.e., the local variance increases above the estimate), mixer 425 provides less filtering of image data 401.

In other words, the local variance value of the Lee filter is used as a control signal that controls the mix between the local mean (i.e., the filtered center pixel) and the unfiltered center pixel. The overall amount of filtering is controlled by adjusting the value of $\sigma_n^2$. As local variance increases (more edge detail), the mix is changed so that more of the unfiltered center pixel is provided as the output signal of the filter. As local variance decreases (flatter regions of the image), the mix shifts in favor of the local mean, i.e., more of the filtered center pixel is provided as the output signal of the filter. As noted above, the value of $\sigma_n^2$ can be adjusted in any number of ways, e.g., by the above described slider window 85 of FIG. 5.

In accordance with the principles of the invention, the mixer control signal is converted to a monochrome video signal and mixer 425 provides a preview filter operation mode responsive to preview mode signal 424. The resulting preview image (again as illustrated in FIG. 5) is dark where local variance is low (i.e., where the most filtering is performed), and bright where the local variance is high (i.e., where the minimum filtering if performed).

Turning now to FIG. 7, an illustrative embodiment of mixer 425 is shown. Mixer 425 includes luma converter 505, multiplexers (muxs) 510, 515 and 520, timing and control element 525 and combination element 530. Timing and control element 525 is responsive to raster timing signal 403, described above, for controlling timing of the video signals for rendering an image on display 230. Combination element 530 implements equation (4b), above. Luma converter 505 and mux 510 convert the filter control signal 421 (β) into a monochrome video signal 511. In particular, in this illustrative implementation the preview filter operation mode shows the filtering performed on the Y samples. As such, luma converter 505 converts filter control signal 421 (β) into a luminance signal and mux 510 multiplexes this signal (under the control of timing and control element 525) with a fixed black chroma value, c (signal 509), in place of the values for Cr and Cb, thereby producing a monochrome video signal 511. Mux 515 selects between either the filtered image data 481 or the video form of filter control signal 421, i.e., signal 511, as a function of the selected mode as represented by preview mode signal 424 (described above). Mux 520 is also under the control of timing and control element 525 and selects either the output signal of mux 515 during the image portion of each video line or the center pixel (signal 406-1) during horizontal and vertical blanking intervals to preserve the synchronization and blanking signals (which are not present in signal 481 or signal 511). It should be noted that the inventive concept could easily be extended to preview Cr and Cb filtering.

The filter described above was tested with a variety of analog and digital video sources. In general, the best image improvement occurs when the noise variance estimate, $\sigma_n^2$, is set to low values, causing about 70% of the preview display area to be light gray or white. Increasing $\sigma_n^2$ to larger values increases overall filtering, and produces a higher percentage of dark gray and black areas in the preview display. Since this increases filtering of the image data, this increases the occurrence of blurred areas in the filtered image.

As described above, and in accordance with the principles of the invention, at least one control signal for a filter is converted to a video signal, which is displayed instead of, or along with, the filtered image. Adjusting the average brightness level of the image of the filter control signal provides a way to quickly adjust filter settings (e.g., the above-described noise variance estimate, a $\sigma_n^2$) to, e.g., reduce noise in the image data without blurring the image—thus improving any subsequent compression of the filtered image data. While the inventive concept is applicable to real-time, the filter settings, or filter template, determined in accordance with the inventive concept can also be stored, e.g., in memory 210, such that the filter template is a priori associated with particular image data and is available for future reference in filtering the image data. As such, when the particular image data is later recalled or retrieved, e.g., from video source 15, for streaming, the associated filter template is retrieved from memory 210 by processor 205 for generating the streaming image with the a priori determined amount of filtering. Whether the image data is filtered in real-time or a filter template is created for later recall, adjusting the filter settings for image data can be performed in any of a number of ways. For example, an entire video can be viewed in the "preview filter operation mode" and any settings effecting the value of the above-described noise variance estimate, $\sigma_n^2$, can be performed in real-time, or even recorded in real-time to produce an associated filter template for later recall. Or, a video can be sampled at different frames of the video (or even at only one frame of the video), with each sampled video frame having associated filter settings that are used for other portions of the video.

Figure 8:
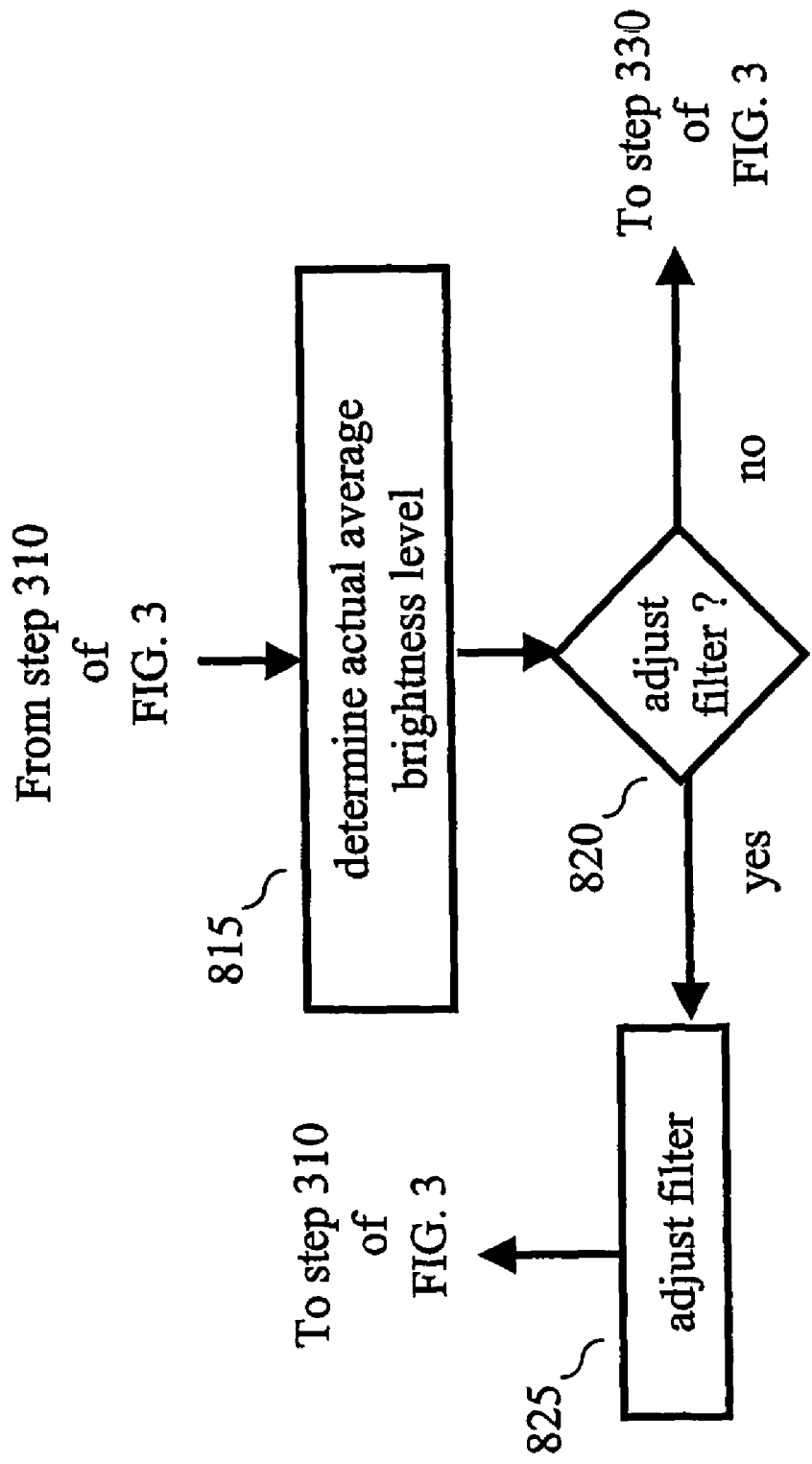

As described above, one method for adjusting the filter settings is for a user to view the image of the filter control signal and adjust the noise variance estimate to achieve a particular average brightness level. In accordance with another aspect of the invention, a target average brightness level for the image of the filter control signal can be a priori set. Once this target brightness level is set, the flow chart of FIG. 3 is modified. In particular steps 315, 320 and 325 are replaced with steps 815, 820 and 825 of FIG. 8, respectively. In step 815, the actual average brightness level for the image of the filter control signal is determined. In step 820, this actual average brightness level is compared to the target brightness level for the image of the filter control signal. If the actual average brightness level is not substantially equal to the target brightness level, then the filter is adjusted in step 825. In this regard, step 825 stores results of previous adjustments to determine in which direction to adjust the filter settings to drive the overall brightness of the image of the filter control signal to the target brightness level. Once the actual average brightness level of the image of the filter control signal is substantially equal to the target brightness level (e.g., within one percent), then step 330 of FIG. 3 is executed as described above.

Figure 9:
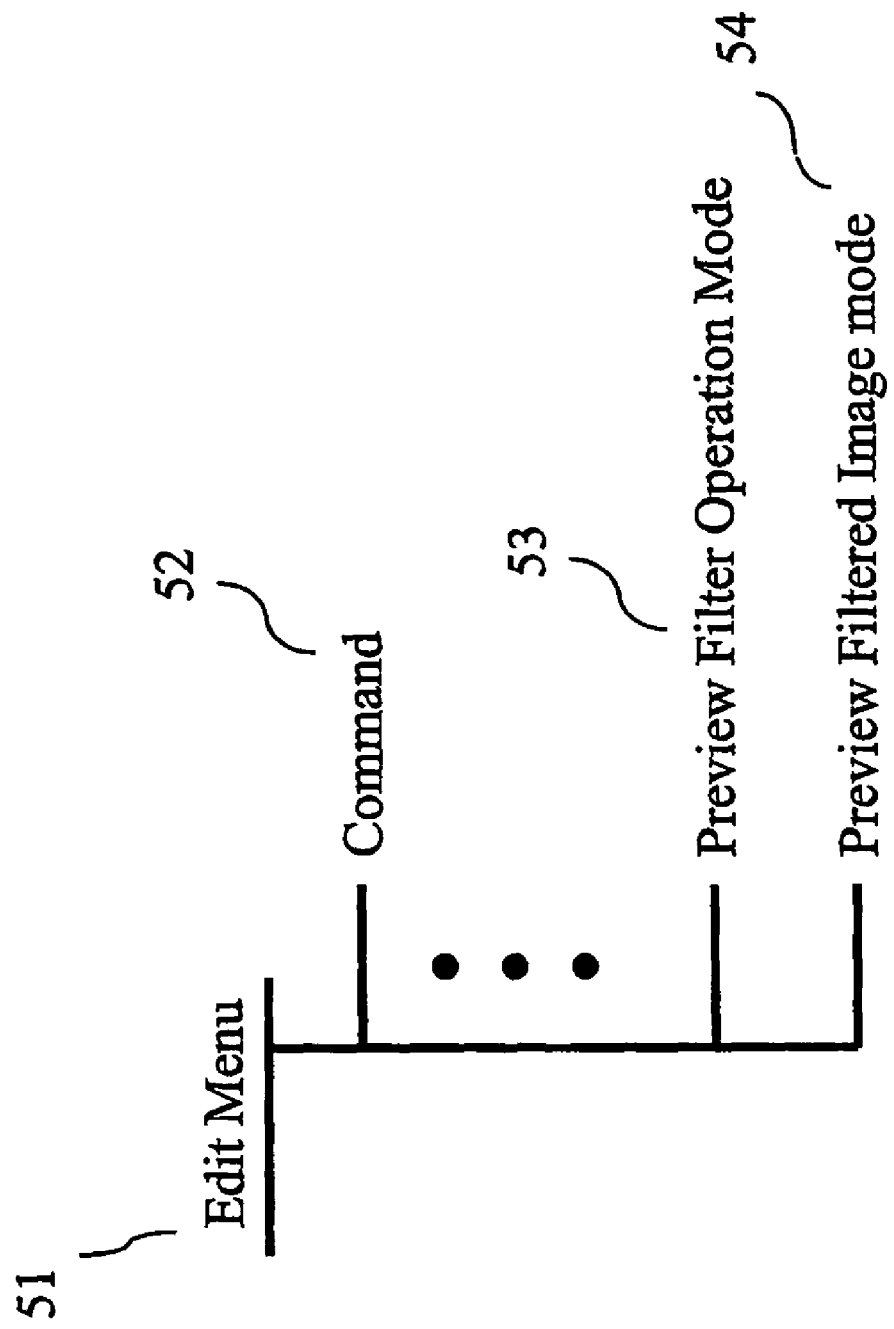

It should be noted that the inventive concept can be implemented in any combination of hardware and software. For example, image server 20 can execute a computer program stored within memory 210 for providing a user interface for selection of the modes, e.g., the "preview filter operation mode" or the "preview filtered image mode," described above. This is further illustrated in FIG. 9, which illustrates a menu-type user interface, where selection of a menu item enables the selection of a particular mode. Illustratively, selection of an "Edit Menu" 51 command further displays a list of menu items available for additional selection. These additional menu items include a command 52 (not necessarily related to the inventive concept described herein), a preview filter operation mode 53 and a preview filtered image mode 54. As such, selection, e.g., of the preview filter operation mode 53 menu item sets signal 424 to the appropriate value and provides a preview mode for rendering on display 230 where filtering is being performed on image data 401 as described above.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs) and/or in one or more stored program-controlled processors (e.g., a microprocessor or digital signal processor (DSP)). Further, although illustrated in the context of a Lee filter, other forms and/or combinations of filtering may be used. Similarly, although illustrated in the context of an image server, the inventive concept is applicable to any stored program controlled based system whether contained in a single piece of physical equipment (like a lap-top computer) or if distributed among a number of pieces of equipment. For example, the filtering may be performed at one computer-based terminal but the at least one control signal may be transmitted for display at another piece of equipment, whether computer-based or not. It is therefore to be understood that numerous modifications may be made to the illustrative embodiments and that other arrangements may be devised without departing from the spirit and scope of the present invention as defined by the appended claims.

The invention claimed is:

1. A method use in removing noise from image data, the method comprising:
   receiving image data representing an image;
   filtering the received image data to remove noise therefrom and to provide filtered image data; and
   displaying where the filtering is being performed on the received image data.

2. The method of claim 1, further comprising the step of displaying the filtered image data.

3. The method of claim 1, further comprising the step of compressing the filtered image data to provide compressed filtered image data.

4. The method of claim 3, further comprising the step of transmitting the compressed filtered image data to an endpoint.

5. The method of claim 1, further comprising the step of, in response to the displaying step, adjusting filter parameters used in the filtering step.

6. The method of claim 5, further comprising the step of storing the adjusted filter parameters for future reference in filtering the image data.

7. The method of claim 1, wherein the filtering is performed in accordance with a Lee filter.

8. A method for use in processing image data, the method comprising:
   filtering image data to provide filtered image data;
   converting a control signal used in the filtering to a video signal; and
   displaying an image representative of the video signal;
   wherein the displayed image indicates where the image data is being filtered.

9. The method of claim 8, wherein the filtering is performed in accordance with a Lee filter.

10. The method of claim 9, wherein the control signal is a smoothing control signal of the Lee filter.

11. The method of claim 10, wherein the convening step converts the control signal to a monochrome video signal.

12. The method of claim 8, wherein the converting step converts the control signal to a monochrome video signal.

13. The method of claim 8, wherein the image is a black and white representation of edge activity in the filtered image data.

14. The method of claim 8, wherein the control signal represents a statistical function.

15. The method of claim 8, wherein the statistical function is a local variance of at least a portion of the image data.

16. The method of claim 15, wherein the portion is a group of pixels of the image data.

17. A method for use in processing image data, the method comprising:
   filtering the image data to provide filtered image data in accordance with at least one value of at least one filter control signal;
   converting the at least one filter control signal to a video signal;
   displaying an image representative of the video signal; and
   adjusting the at least one value of the at least one filter control signal in response to the displayed image.

18. The method of claim 17 wherein the adjusting step compares an average brightness level of the displayed image to a predefined average brightness level.

19. A server for processing image data, the server comprising:
   a filter for filtering image data to provide filtered image data;
   a video converter for converting at least one control signal of the filter to a video signal; and
   a display for showing an image representative of the video signal.

20. The server of claim 19, wherein the display also shows the filtered image data.

21. A video processor comprising:
   a receiver for receiving image data;
   a video processing element for filtering the received image data to remove noise therefrom, wherein the video processing element includes a filter preview element for providing a video signal representative of a control signal within the video processing element; and
   a display for showing an image representative of the video signal, wherein the image provides a visual indication of where noise is being removed from the image data.

22. Apparatus comprising:
   a filter for filtering image data to provide filtered image data and a filter control signal;
   a video converter for converting the filter control signal to a video signal; and
   a display for showing an image representative of the video signal.

23. The apparatus of claim 22 further comprising:
   a multiplexer coupled to the filter, video converter and the display, wherein the multiplexer is responsive to a mode control signal for coupling either the filtered image data or the video signal to the display.

24. The apparatus of claim 22, wherein the filter is a Lee filter and the control signal is a measure of a local variance of at least a portion of the image data.

25. A computer-readable medium encoded with a computer program comprising the steps of:

enabling selection of one of a number of display modes for use in processing image data, wherein at least one of the number of display modes is associated with displaying where filtering of noise in the image data is occurring; and enabling adjustment of at least one filter control signal used in the filtering of noise in the image data.

* * * * *